(12) United States Patent
Kim et al.

(10) Patent No.: US 9,215,035 B2
(45) Date of Patent: Dec. 15, 2015

(54) METHOD OF TRANSMITTING AND RECEIVING PHYSICAL DOWNLINK SHARED CHANNEL IN WIRELESS COMMUNICATION SYSTEM

(75) Inventors: Bong Hoe Kim, Anyang-si (KR); Yu Jin Noh, Anyang-si (KR); Dae Won Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 1130 days.

(21) Appl. No.: 13/128,626

(22) PCT Filed: Dec. 8, 2009

(86) PCT No.: PCT/KR2009/007301
§ 371 (c)(1),
(2), (4) Date: May 10, 2011

(87) PCT Pub. No.: WO2010/068011
PCT Pub. Date: Jun. 17, 2010

(65) Prior Publication Data
US 2011/0222501 A1  Sep. 15, 2011

Related U.S. Application Data

(60) Provisional application No. 61/120,817, filed on Dec. 8, 2008.

(51) Int. Cl.
*H04W 4/00* (2009.01)
*H04L 1/00* (2006.01)
*H04W 74/08* (2009.01)
*H04W 74/00* (2009.01)

(52) U.S. Cl.
CPC ......... *H04L 1/0041* (2013.01); *H04W 74/0833* (2013.01); *H04L 1/0061* (2013.01); *H04W 74/002* (2013.01)

(58) Field of Classification Search
CPC .. H04B 7/024; H04L 1/0041; H04W 74/0833
USPC .......................................... 370/329
See application file for complete search history.

(56) References Cited

U.S. PATENT DOCUMENTS

| | | | |
|---|---|---|---|
| 8,315,225 B2* | 11/2012 | Xu et al. | 370/330 |
| 8,331,308 B1* | 12/2012 | Au et al. | 370/330 |
| 2006/0013161 A1* | 1/2006 | Suzuki | 370/328 |
| 2008/0141103 A1* | 6/2008 | Miyazaki et al. | 714/801 |
| 2008/0273610 A1* | 11/2008 | Malladi et al. | 375/260 |

(Continued)

FOREIGN PATENT DOCUMENTS

| KR | 1020040016065 | 2/2004 |
|---|---|---|
| KR | 1020050027679 | 3/2005 |

(Continued)

*Primary Examiner* — Asad Nawaz
*Assistant Examiner* — Syed S Ali
(74) *Attorney, Agent, or Firm* — Lee, Hong, Degerman, Kang & Waimey

(57) ABSTRACT

A method of transmitting and receiving a physical downlink shared channel in a wireless communication system is disclosed. A method of receiving physical downlink shared channels in a terminal which receives downlink data from a plurality of cells simultaneously in a wireless communication system includes receiving the physical downlink shared channel scrambled using a scrambling sequence determined according to same cell ID and same Radio Network Temporary Identity (RNTI) from the plurality of cells.

8 Claims, 2 Drawing Sheets

(56) References Cited

U.S. PATENT DOCUMENTS

2009/0141690 A1* 6/2009 Fan et al. .................. 370/335
2009/0257449 A1* 10/2009 Chen et al. ................ 370/470
2009/0323625 A1* 12/2009 Lee et al. .................. 370/329
2010/0034161 A1* 2/2010 Luo et al. .................. 370/329
2010/0173659 A1* 7/2010 Shin et al. .................. 455/500

FOREIGN PATENT DOCUMENTS

KR  1020070047669  5/2007
WO  2007/091924    8/2007

* cited by examiner

METHOD OF TRANSMITTING AND RECEIVING PHYSICAL DOWNLINK SHARED CHANNEL IN WIRELESS COMMUNICATION SYSTEM

CROSS-REFERENCE TO RELATED APPLICATIONS

This application is the National Stage filing under 35 U.S.C. 371 of International Application No. PCT/KR2009/007301, filed on Dec. 8, 2009, which claims the benefit of U.S. Provisional Application Ser. No. 61/120,817, filed on Dec. 8, 2008, the contents of which are incorporated by reference herein in their entirety.

TECHNICAL FIELD

The present invention relates to a wireless communication system, and more particularly, to a method of transmitting and receiving a physical downlink shared channel in a wireless communication system.

BACKGROUND ART

Recently, a Multiple Input Multiple Output (MIMO) system has been spotlighted as a wideband wireless mobile communication technology. The MIMO system refers to a system capable of improving data communication efficiency using multiple antennas. The MIMO system may be classified into a space multiplexing scheme and a space diversity scheme, depending on whether or not the same data is transmitted.

The space multiplexing method refers to a scheme for simultaneously transmitting different data via a plurality of transmission antennas so as to rapidly transmit data without increasing system bandwidth. The space diversity scheme refers to a scheme for transmitting the same data via a plurality of transmission antennas so as to obtain transmission diversity. Examples of such a space diversity scheme include a space time channel coding scheme.

In addition, the MIMO technology may be classified into an open loop scheme and a closed loop scheme according to feedback of channel information from a reception side to a transmission side. The open loop scheme includes a Space-Time Trellis Code (STTC) scheme in which a transmission side transmits information in parallel, and a reception side detects a signal using a Zero Forcing (ZF) scheme and a Minimum Mean Square Error (MMSE) scheme repeatedly and obtains transmission diversity and coding gain using a space domain and Bell Laboratories Layered Space-Time (BLAST) for increasing information amount by the number of transmission antennas, or the like. The closed loop scheme includes a Transmit Antenna Array (TxAA) scheme, or the like.

FIG. 1 is a conceptual diagram of a Coordinated Multi-Point (CoMP) of the existing intra eNBs and inter eNBs.

Referring to FIG. 1, intra eNBs 110 and 120 and an inter eNB 130 exist in a multi-cell environment. In a Long Term Evolution (LTE) system, the intra eNB is composed of several cells (or sectors). In general, cells which are physically located at the same location are referred to as intra cells and cells located at different locations are referred to as inter cells. As shown in FIG. 1, a single-cell MIMO user located in a single cell may communicate with one serving cell in one cell (sector), and a multi-cell MIMO user located at a cell boundary may communicate with a plurality of serving eNBs in multiple cells (sectors).

A CoMP system refers to a system for applying improved MIMO transmission in a multi-cell environment so as to improve data transmission efficiency of a user who is located at a cell boundary. If the CoMP system is applied, it is possible to reduce inter-cell interference in a multi-cell environment. If such a CoMP system is used, a terminal may receive common data from multi-cell base stations. In addition, the base stations may simultaneously support one or more terminals MS1, MS2, . . . , and MSK using the same radio frequency resource so as to improve system performance. That is, the base station may perform a Space Division Multiple Access (SDMA) method based on channel status information between the base station and the terminal.

The CoMP scheme may be classified into a joint processing scheme by data sharing and a coordinated scheduling scheme/beamforming scheme.

In the CoMP system, a serving base station and one or more coordinated base stations are connected to a scheduler via a wired or wireless network. The scheduler may operate by receiving channel information of channel status between terminals MS1, MS2, . . . , and MSK.

Next, a random access process will be described.

A terminal performs a random access process, for initial network access, handover, presence of downlink data, scheduling request signal transmission, and the like. By this process, various terminal IDs (UE IDs) which identify the terminals are acquired from a network and will be used for communication with a base station in the future.

First, a process of, at a terminal, performing a random access process in order to initially access a network or to reconfigure a wireless link will be described.

The terminal transmits a preamble for random access. The preamble to be used for random access may be received from an upper layer. At this time, a Random Access-Radio Network Temporary Identity (hereinafter, referred to as "RA-RNTI") used for random access is acquired by time and frequency resources of the preamble used for random access.

The terminal waits for reception of a Physical Downlink Control Channel (hereinafter, referred to as "PDCCH") which is Cyclic Redundancy Check (CRC)-masked with an RA-RNTI for a specific time, after transmitting the preamble.

The terminal receives a Physical Downlink Shared Channel (hereinafter, referred to as "PDSCH") including a temporary Cell-Radio Network Temporary Identity (hereinafter, referred to as "temporary C-RNTI"), after receiving the PDCCH CRC-masked with the RA-RNTI.

The terminal performs the random access process again, if the PDCCH CRC-masked with the RA-RNTI or the PDSCH including the temporary C-RNTI is not received for the specific time.

If the UE successfully decodes the PDCCH CRC-masked with the RA-RNTI and the PDSCH including the temporary C-RNTI, the terminal transmits a message including the temporary C-RNTI to a base station in uplink.

The terminal changes the temporary C-RNTI to a C-RNTI upon successfully receiving the PDCCH CRC-masked with the temporary C-RNTI and confirming the temporary C-RNTI in response to the message transmitted in uplink.

Next, a random access process for handover, determination of presence of downlink data, scheduling request signal transmission and the like will be described.

The terminal transmits a preamble for random access. The preamble to be used for random access may be received from an upper layer. At this time, an RA-RNTI used for random access is acquired by time and frequency resources of the preamble used for random access.

The terminal waits for reception of a PDCCH which is CRC-masked with an RA-RNTI for a specific time, after transmitting the preamble.

The terminal receives a PDSCH including a temporary C-RNTI after receiving the PDCCH CRC-masked with the RA-RNTI.

The terminal performs the random access process again, if the PDCCH CRC-masked with the RA-RNTI or the PDSCH including the temporary C-RNTI is not received for the specific time.

The terminal which receives the PDSCH including the C-RNTI transmits a message including the temporary C-RNTI to a base station in uplink.

In random access for handover or scheduling request signal transmission, the terminal finishes the random access process when receiving the PDCCH CRC-masked with the temporary C-RNTI for uplink transmission within a predetermined time. If downlink data exists, the random access process is finished when any PDCCH CRC-masked with the temporary C-RNTI is received.

Thereafter, the base station CRC-masks the PDCCH with the RNTI of the terminal, scrambles and transmits the PDCCH using a scrambling sequence determined according to a cell ID, and scrambles and transmits the PDSCH using a scrambling sequence determined according to the RNTI of the terminal and the cell ID. Accordingly, in the CoMP system, there is a need for a PDCCH and PDSCH transmission method for scrambling a PDCCH and a PDSCH using a scrambling sequence determined according to a certain cell ID.

As described above, as a Coordinated Multi-Point (CoMP) system has appeared, there is a need for a method of transmitting a physical downlink shared channel in the CoMP system.

DISCLOSURE OF INVENTION

Technical Problem

Accordingly, the present invention is directed to a method of transmitting and receiving a physical downlink shared channel in a wireless communication system that substantially obviates one or more problems due to limitations and disadvantages of the related art.

An object of the present invention is to provide a method of transmitting a physical downlink shared channel in a wireless communication system which operates as a Coordinated Multi-Point (CoMP) system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, a method of receiving physical downlink shared channels in a terminal which receives downlink data from a plurality of cells simultaneously in a wireless communication system includes receiving the physical downlink shared channel scrambled using a scrambling sequence determined according to same cell ID and same Radio Network Temporary Identity (RNTI) from the plurality of cells.

The same cell ID may be a cell ID of a serving cell.

The RNTI may be acquired after random access procedure in one of plurality of cells and may be shared among the plurality of cells. Additionally, the same RNTI may be newly defined and may be reported to the plurality of cells by a serving cell.

The method may further include receiving a physical downlink control channel Cyclic Redundancy Check (CRC)-masked with an RNTI acquired after random access or newly defined by a serving cell and scrambled using scrambling sequence determined according to a cell ID of the serving cell, from the serving cell.

The method may further include receiving a physical downlink control channel Cyclic Redundancy Check (CRC)-masked with an RNTI acquired after random access or newly defined by a serving cell and scrambled using a scrambling sequence determined according to a cell ID of each of the plurality of cells, from the plurality of cells.

In another aspect of the present invention, a method of transmitting a physical downlink shared channel at a base station in a wireless communication system includes scrambling the physical downlink shared channel using a scrambling sequence determined according to a cell ID of a serving cell, and transmitting the scrambled physical downlink shared channel to a terminal which simultaneously receives downlink data from a plurality of cells.

The scrambling sequence may be determined according to the cell ID of the serving cell and a Radio Network Temporary Identity (RNTI) acquired after random access or newly defined by the serving cell.

Advantageous Effects

According to the embodiments of the present invention, it is possible to provide a method of transmitting a physical downlink shared channel in a wireless communication system which operates in a Coordinated Multi-Point (CoMP) mode, by defining the plurality of cells, which transmits the physical downlink shared channel to the terminal, to transmit the physical downlink shared channel scrambled using the scrambling sequence determined according to the same cell ID and the same RNTI.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
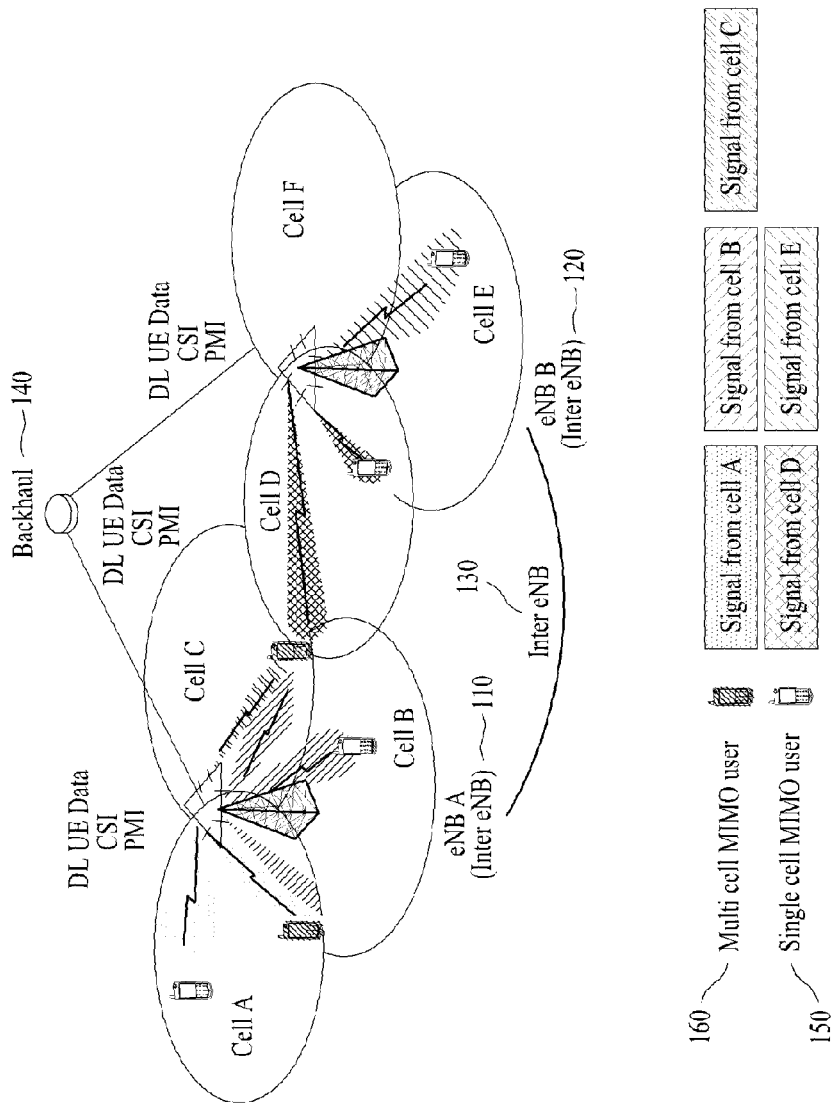
FIG. 1 is a conceptual diagram of a Coordinated Multi-Point (CoMP) of the existing intra eNBs and inter eNBs.

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details. For example, although, in the following description, it is assumed that the mobile communication system is a 3rd Generation Partnership Project (3GPP) Long Term Evolution (LTE) system, the present invention is applicable to other mobile communication systems excluding the unique matters of the 3GPP LTE system.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In the following description, it is assumed that a terminal includes a mobile or fixed user equipment such as a User Equipment (UE) or a Mobile Station (MS). In addition, it is assumed that a base station includes any node of a network end communicating with the terminal, such as a Node B, an eNode B, or a base station.

A base station transmits downlink control information to a terminal through a Physical Downlink Control Channel (hereinafter, referred to as "PDCCH") and transmits data to the terminal through a Physical Downlink Shared Channel (PDSCH). The PDCCH will first be described and scrambling of the PDCCH and the PDSCH will then be described.

The PDCCH includes control information of data transmitted in downlink or uplink. Accordingly, the terminal detects the PDCCH and determines whether there is data to be transmitted to the terminal or whether the terminal will transmit data. In general, the PDCCH is transmitted via every subframe. The terminal operates a random function using a terminal ID and determines whether the PDCCH is transmitted to the terminal itself.

The base station generates the PDCCH using a predetermined number of frequency resources as a basic unit. In an LTE system, control information is transmitted using 36 frequency resources as one Control Channel Element (hereinafter, referred to as "CCE"). When considering the information amount of data transmitted to the terminal, a channel status, an operation mode, and the like, control information may be transmitted using several CCEs. In the LTE system, it is defined that control information may be transmitted using 1, 2, 4 or 8 CCEs.

In addition, the downlink control information is interleaved in a frequency domain so as to be transmitted over a downlink band. However, since the processing capabilities of the terminal are limited, it is actually difficult to find all the locations of the possible PDCCHs so as to determine whether or not there is a signal transmitted to the terminal. Accordingly, the location of the control information transmitted to the terminal is specified by a random function using the terminal ID such that the terminal determines whether there is a downlink control signal transmitted to the terminal itself using the location. The terminal masks Cyclic Redundancy Check (CRC) with its terminal ID, in order to determine whether there is a PDCCH transmitted to the terminal itself.

Information transmitted through the PDCCH may be divided into control information of downlink data and control information of uplink data. The control information of the downlink data includes information about resource allocation, information about modulation and coding, information about a Hybrid Automatic Repeat Request (HARQ) process, a new data indicator, information about redundancy version, and information about power control. If Multiple Input Multiple Output (MIMO) transmission is supported, information about precoding may be further included. The control information of the downlink data is differently defined according to an operation mode.

The control information of the uplink data includes information about resource allocation, hopping information, information about modulation and coding, HARQ process information, a new data indicator, information about power control, information about a resource of a reference signal for demodulation, and Channel Quality Indicator (hereinafter, referred to as "CQI") transmission request information. If MIMO transmission is supported in uplink, information about precoding is further included.

The PDCCH is scrambled using a scrambling sequence determined according to a cell ID. Equation 1 shows data of the scrambled PDCCH and Equation 2 shows an initial value of the scrambling sequence used when the PDCCH is scrambled.

$$\tilde{b}(i) = (b(i) + c(i)) \bmod 2 \qquad \text{[Equation 1]}$$

$$c_{init} = \left\lfloor \frac{n_s}{2} \right\rfloor 2^9 + N_{ID}^{cell} \qquad \text{[Equation 2]}$$

where, b(i) denotes the data of the PDCCH, and c(i) denotes the scrambling sequence. In addition, ns denotes a slot number and NIDcell denotes a cell ID.

The scrambling of the PDCCH is simultaneously applied to the control information of all users, which is transmitted through the PDCCH.

The PDCCH is scrambled using the scrambling sequence determined according to a cell ID and a Radio Network Temporary Identity (RNTI) of the terminal. Equation 3 shows data of the scrambled PDSCH and Equation 4 shows an initial value of the scrambling sequence used when the PDSCH is scrambled.

$$\tilde{b}^q(i) = (b^q(i) + c^q(i)) \bmod 2 \qquad \text{[Equation 3]}$$

$$c_{init} = n_{RNTI} \cdot 2^{14} + q \cdot 2^{13} + \left\lfloor \frac{n_s}{2} \right\rfloor 2^9 + N_{ID}^{cell} \quad \text{[Equation 4]}$$

where, bq(i) denotes data of a q-th codeword of the PDSCH and cq(i) denotes scrambling sequence. In addition, q is an index of a codeword and becomes 0 in case of a single codeword. In addition, ns denotes a slot number and NIDcell denotes a cell ID. Furthermore, nRNTI denotes a terminal ID according to the kind of data transmitted through the PDSCH. That is, in the case of random access, nRNTI becomes a Random Access-Radio Network Temporary Identity (hereinafter, referred to as RA-RNTI) or a temporary cell-RNTI (hereinafter, referred to as "temporary C-RNTI"). In case of transmitting persistent data, nRNTI becomes a Semi Persistent-RNTI (SPS-RNTI) and, in case of transmitting general data, nRNTI becomes a C-RNTI.

First, a method of receiving a PDSCH according to a first embodiment of the present invention will be described.

Figure 2:
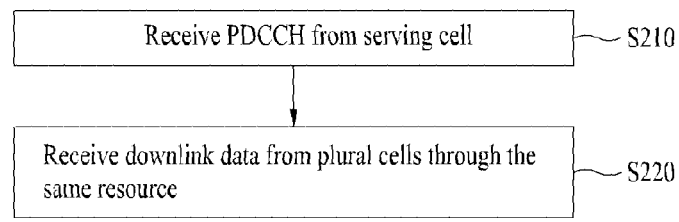
FIG. 2 is a flowchart illustrating a method of receiving a Physical Downlink Shared Channel (PDSCH) according to a first embodiment of the present invention.

FIG. 2 is a flowchart illustrating the method of receiving the PDSCH according to the first embodiment of the present invention.

In the first embodiment of the present invention, a terminal receives downlink control information from one of a plurality of coordinated cells. At this time, the cell which transmits the downlink control information is called a serving cell, and the serving cell may be determined after initial access of the terminal. The plurality of cells which is coordinated in a CoMP mode of the terminal share data and scheduling information. All the cells which are coordinated in the CoMP mode of the terminal may transmit downlink data to the terminal or some of the cells which are coordinated in the CoMP mode of the terminal may transmit downlink data to the terminal. At this time, the plurality of cells transmits the downlink data to the terminal through the same resource.

As shown in FIG. 2, the terminal receives the PDCCH from the serving cell (S210).

At this time, the PDCCH is CRC-masked with a C-RNTI acquired by the terminal in the random access process or a RNTI which is newly defined by the serving cell, and is scrambled using a scrambling sequence determined according to the cell ID of the serving cell.

That is, the serving cell may mask the CRC in PDCCH with the C-RNTI acquired by the terminal in the random access process and report the C-RNTI to the other cells so that the other coordinated cells use C-RNTI to mask the CRC in PDCCH. Alternatively, the serving cell may define a new RNTI, report the RNTI to the other cells, and CRC-mask the PDCCH with the newly defined RNTI. At this time, the newly defined RNTI may be a COMP-RNTI.

In addition, the serving cell scrambles the PDCCH using the scrambling sequence determined according to the ID of the serving cell and transmits the PDCCH to the terminal.

Then, the terminal receives a PDSCH from the plurality of cells through the same resource (S220).

In the first embodiment of the present invention, the coordinated cells allocate the same resource in order to improve performance of a terminal located at a cell boundary so as to use transmission diversity, beamforming, or the like.

Since the PDSCH is transmitted through the same resource, the plurality of cells scrambles the PDSCH using the scrambling sequence determined according to the same cell ID and the same RNTI.

At this time, a certain cell may transmit its cell ID to coordinated cells such that the coordinated cells scramble the PDSCH using scrambling sequence determined according to the received cell ID. The certain cell may be the serving cell.

In addition, the serving cell reports the C-RNTI acquired by the terminal in the random access process to the coordinated cells such that the coordinated cells scramble the PDSCH using the scrambling sequence determined according to the received C-RNTI. Alternatively, the serving cell may define a new RNTI and report the RNTI to the coordinated cells, such that the cells scramble the PDSCH using the scrambling sequence determined according to the received C-RNTI. At this time, the newly defined RNTI may be a COMP-RNTI.

Next, a method of receiving a PDSCH according to a second embodiment of the present invention will be described with reference to FIG. 3.

Figure 3:
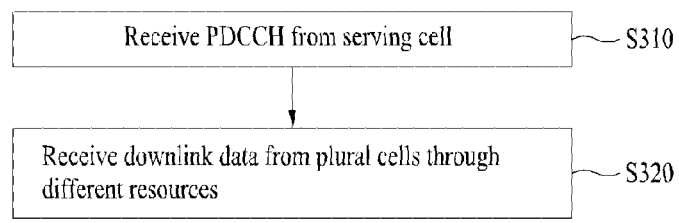
FIG. 3 is a flowchart illustrating a method of receiving a PDSCH according to a second embodiment of the present invention.

FIG. 3 is a flowchart illustrating the method of receiving the PDSCH according to the second embodiment of the present invention.

In the second embodiment of the present invention, a terminal receives downlink control information from one of a plurality of coordinated cells. At this time, the cell which transmits the downlink control information is called a serving cell, and the serving cell may be determined after initial access of the terminal. The plurality of cells which is coordinated in a CoMP mode of the terminal share data and scheduling information. All the cells which are coordinated in the CoMP mode of the terminal may transmit downlink data to the terminal or some of the cells which are coordinated in the CoMP mode of the terminal may transmit downlink data to the terminal. At this time, the plurality of cells transmits the downlink data to the terminal through different resources.

As shown in FIG. 3, the terminal receives the PDCCH from the serving cell (S310). The terminal searches for only the PDCCH of the serving cell and determines whether the PDCCH is transmitted to the terminal itself. The PDCCH includes all control information of the plurality of cells for transmitting the downlink data.

At this time, the PDCCH is CRC-masked with a C-RNTI acquired by the terminal in the random access process or an RNTI which is newly defined by the serving cell, and is scrambled using a scrambling sequence determined according to the cell ID of the serving cell.

That is, the serving cell may CRC-mask the PDCCH with the C-RNTI acquired by the terminal in the random access process and report the C-RNTI to the other cells. Alternatively, the serving cell may define a new RNTI, report the RNTI to the other cells, and CRC-mask the PDCCH with the newly defined RNTI. At this time, the newly defined RNTI may be a COMP-RNTI.

In addition, the serving cell scrambles the PDCCH using the scrambling sequence determined according to the cell ID of the serving cell and transmits the PDCCH to the terminal.

Then, the terminal receives a PDSCH from the plurality of cells through the different resources (S320).

In the second embodiment of the present invention, the coordinated cells transmit the PDSCH through the different resources. At this time, since the PDSCH is transmitted from different cells through different resources, the plurality of cells scramble the PDSCH using the scrambling sequence determined according to the respective cell IDs of the plurality of cells and transmits the PDSCH.

Next, a method of receiving a PDSCH according to a third embodiment of the present invention will be described with reference to FIG. 4.

Figure 4:
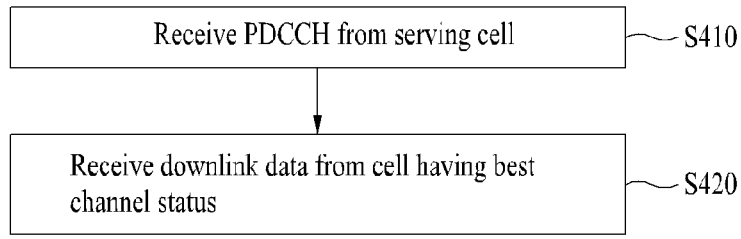
FIG. 4 is a flowchart illustrating a method of receiving a PDSCH according to a third embodiment of the present invention.

FIG. 4 is a flowchart illustrating the method of receiving the PDSCH according to the third embodiment of the present invention.

In the third embodiment of the present invention, a terminal receives a PDCCH from one of a plurality of coordinated cells. At this time, the cell which transmits the PDCCH is called a serving cell, and the serving cell may be determined after initial access of the terminal. In addition, downlink data may be transmitted from another cell which does not transmit the PDCCH. For example, a cell having a best downlink channel status may transmit the downlink data.

As shown in FIG. 4, the terminal receives the PDCCH from the serving cell (S410).

At this time, the PDCCH is CRC-masked with a C-RNTI acquired by the terminal in the random access process or a RNTI which is newly defined by the serving cell, and is scrambled using a scrambling sequence determined according to the cell ID of the serving cell.

That is, the serving cell may CRC-mask the PDCCH with the C-RNTI acquired by the terminal in the random access process and report the C-RNTI to the other cells. Alternatively, the serving cell may define a new RNTI, report the RNTI to the other cells, and CRC-mask the PDCCH with the newly defined RNTI. At this time, the newly defined RNTI may be a COMP-RNTI.

In addition, the serving cell scrambles the PDCCH using the scrambling sequence determined according to the cell ID of the serving cell and transmits the PDCCH to the terminal.

Then, the terminal receives downlink data from the cell having the best channel status (S420).

The cell which transmits the downlink data scrambles the PDSCH using the scrambling sequence determined according to the cell ID and the RNTI. At this time, the cell ID may be the cell ID of the serving cell or the cell ID of the cell which transmits the PDSCH. The RNTI may be a C-RNTI acquired by the terminal in the random access process or a new RNTI defined by the serving cell. At this time, the newly defined RNTI may be a COMP-RNTI.

Next, a method of receiving a PDSCH according to a fourth embodiment of the present invention will be described with reference to FIG. 5.

Figure 5:
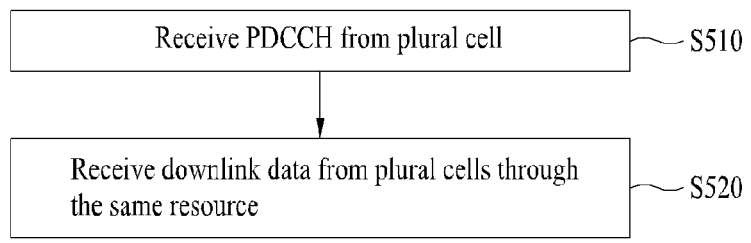
FIG. 5 is a flowchart illustrating a method of receiving a PDSCH according to a fourth embodiment of the present invention.

FIG. 5 is a flowchart illustrating the method of receiving the PDSCH according to the fourth embodiment of the present invention.

In the fourth embodiment of the present invention, coordinated cells share data and scheduling information. A terminal may simultaneously receive a PDCCH from the coordinated cells. A PDCCH for one terminal may be transmitted from all or some of the coordinated cells, and the cells which transmit the PDCCH also transmit a PDSCH. At this time, the PDSCH is transmitted through the same resource.

As shown in FIG. 5, the terminal receives the PDCCH from the plurality of cells (S510).

At this time, the PDCCH is CRC-masked with a C-RNTI acquired by the terminal in the random access process or an RNTI which is newly defined by the serving cell, and is scrambled using the scrambling sequence determined according to the cell ID of each of the plurality of cells.

That is, when the serving cell reports the C-RNTI acquired by the terminal in the random access process to the plurality of cells, each of the plurality of cells may CRC-mask the PDCCH with the C-RNTI acquired by the terminal in the random access process. Alternatively, the serving cell may define a new RNTI and report the RNTI to the plurality of cells, and each of the plurality of cells may CRC-mask the PDCCH with the newly defined RNTI. At this time, the newly defined RNTI may be a COMP-RNTI.

In addition, each of the plurality of cells scrambles the PDCCH using the scrambling sequence determined according to the cell ID of each of the plurality of cells and transmits the PDCCH to the terminal.

Then, the terminal receives downlink data from the plurality of cells through the same resource (S520).

In the fourth embodiment of the present invention, the coordinated cells allocate the same resource in order to improve performance of a terminal located at a cell boundary so as to use transmission diversity, beamforming, or the like.

Since a PDSCH is transmitted through the same resource, the plurality of cells scrambles the PDSCH using the scrambling sequence determined according to the same cell ID and the same RNTI.

At this time, a certain cell may transmit its cell ID to coordinated cells such that the coordinated cells scramble PDSCH using the scrambling sequence determined according to the received cell ID. The certain cell may be the serving cell.

In addition, the serving cell reports the C-RNTI acquired by the terminal in the random access process to the coordinated cells such that the coordinated cells scramble the PDSCH using the scrambling sequence determined according to the received C-RNTI. Alternatively, the serving cell may define a new RNTI and report the RNTI to the coordinated cells, such that the cells scramble the PDSCH using the scrambling sequence determined according to the received C-RNTI. At this time, the newly defined RNTI may be a COMP-RNTI.

Next, a method of receiving a PDSCH according to a fifth embodiment of the present invention will be described with reference to FIG. 6.

Figure 6:
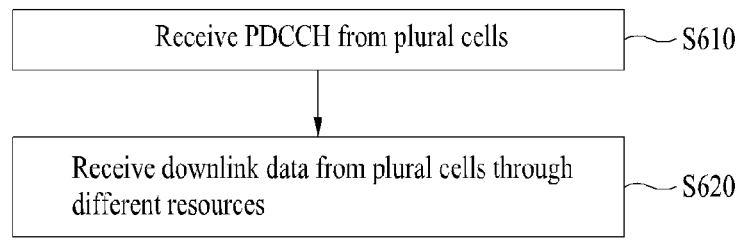
FIG. 6 is a flowchart illustrating a method of receiving a downlink data channel according to a fifth embodiment of the present invention.
Figure 7:
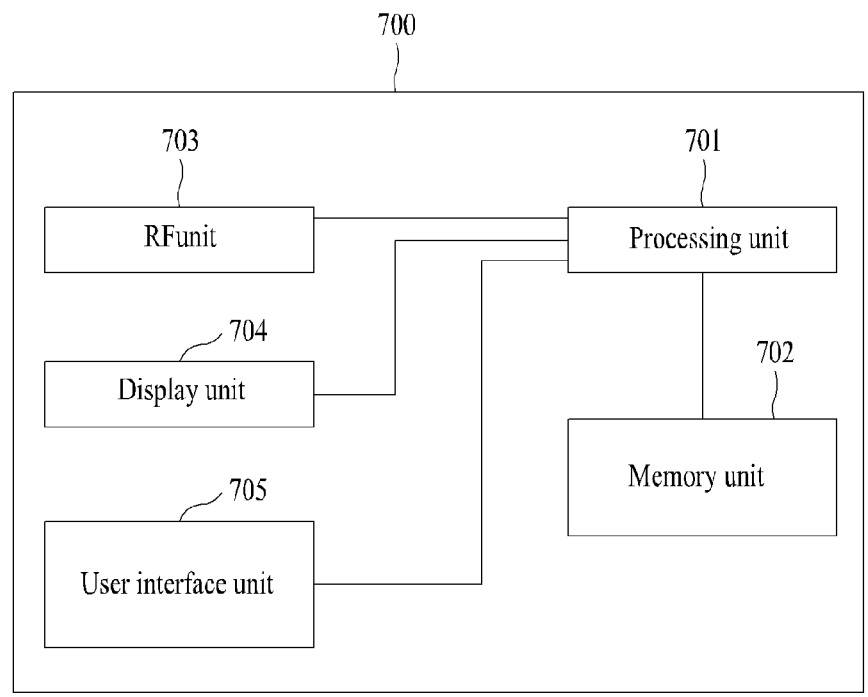
FIG. 7 is a block diagram showing the configuration of a device which is applicable to a user equipment or a base station so as to implement the present invention.

FIG. 6 is a flowchart illustrating the method of receiving the PDSCH according to the fifth embodiment of the present invention.

In the fifth embodiment of the present invention, coordinated cells share data and scheduling information. A terminal may simultaneously receive a PDCCH from the coordinated cells. A PDCCH for one terminal may be transmitted from all or some of the coordinated cells, and the cells which transmit the PDCCH also transmit a PDSCH. At this time, the PDSCH is transmitted through different resources.

As shown in FIG. 6, the terminal receives the PDCCH from the plurality of cells (S610).

At this time, the PDCCH is CRC-masked with a C-RNTI acquired by the terminal in the random access process or a RNTI which is newly defined by the serving cell, and is scrambled using the scrambling sequence determined according to the cell ID of each of the plurality of cells.

That is, when the serving cell reports the C-RNTI acquired by the terminal in the random access process to the plurality of cells, each of the plurality of cells may CRC-mask the PDCCH with the C-RNTI acquired by the terminal in the random access process. Alternatively, the serving cell may define a new RNTI and report the RNTI to the plurality of cells, and each of the plurality of cells may CRC-mask the PDCCH with the newly defined RNTI. At this time, the newly defined RNTI may be a COMP-RNTI.

In addition, each of the plurality of cells scrambles the PDCCH using the scrambling sequence determined according to the cell ID of each of the plurality of cells and transmits the PDCCH to the terminal.

Then, the terminal receives the PDSCH from the plurality of cells through different resources (S620).

In the fifth embodiment of the present invention, the coordinated cells transmit the PDSCH through the different resources. At this time, since the PDSCH is transmitted from different cells through different resources, each of the plurality of cells scrambles the PDSCH using the scrambling sequence determined according to the cell ID of each of the plurality of cells and transmits the PDSCH.

ad, a touch screen or the like. The RF unit 703 may be electrically connected to the processing unit 701 so as to transmit or receive an RF signal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method of receiving physical downlink shared channels in a terminal which receives downlink data from a plurality of cells simultaneously in a wireless communication system, the method comprising:

receiving, from each of the plurality of cells, a physical downlink shared channel (PDSCH) scrambled using a scrambling sequence determined according to a same cell ID and a same Radio Network Temporary Identity (RNTI), wherein the plurality of cells use the same cell ID in scrambling the PDSCH with the scrambling sequence for performing a coordinated multi-point (CoMP) operation, instead of using individual cell IDs of the plurality of cells, and wherein the PDSCH is scrambled based on following equations:

$$\tilde{b}^q(i) = (b^q(i) + c^q(i)) \bmod 2$$

$$c_{init} = n_{RNTI} \cdot 2^{14} + q \cdot 2^{13} + \left\lfloor \frac{n_s}{2} \right\rfloor 2^9 + N_{ID}^{cell}$$

where $b^{q(i)}$ denotes data of a q-th codeword of the PDSCH, $c^{q(i)}$ denotes the scrambling cell sequence, $n_s$ denotes a slot number, $N_{ID}^{cell}$ denotes the same cell ID, $n_{RNTI}$ denotes the same RNTI.

2. The method according to claim 1, wherein the same cell ID is a cell ID of a serving cell.

3. The method according to claim 1, wherein the same RNTI is acquired after random access or newly defined and reported to the plurality of cells by a serving cell.

4. The method according to claim 1, further comprising receiving a physical downlink control channel Cyclic Redundancy Check (CRC)-masked with an RNTI acquired after random access or newly defined by a serving cell and scrambled using a scrambling sequence determined according to a cell ID of the serving cell, from the serving cell.

5. The method according to claim 1, further comprising receiving physical downlink control channels Cyclic Redundancy Check (CRC)-masked with an RNTI acquired after random access or newly defined by a serving cell and scrambled using a scrambling sequence determined according to a cell ID of each of the plurality of cells, from each of the plurality of cells.

6. A method of transmitting a physical downlink shared channel at a base station in a wireless communication system, the method comprising:

scrambling the physical downlink shared channel (PDSCH) using a scrambling sequence determined according to a cell ID of a serving cell; and transmitting the scrambled physical downlink shared channel to a terminal which simultaneously receives downlink data from a plurality of cells, wherein the plurality of cells use a same cell ID in scrambling the PDSCH with the scrambling sequence for performing a coordinated multi-point (CoMP) operation, instead of using individual cell IDs of the plurality of cells, and wherein the PDSCH is scrambled based on following equations:

$$\tilde{b}^q(i) = (b^q(i) + c^q(i)) \bmod 2$$

$$c_{init} = n_{RNTI} \cdot 2^{14} + q \cdot 2^{13} + \left\lfloor \frac{n_s}{2} \right\rfloor 2^9 + N_{ID}^{cell}$$

where $b^{q(i)}$ denotes data of a q-th codeword of the PDSCH, $c^{q(i)}$ denotes the scrambling sequence, $n_s$ denotes a slot number, $N_{IC}^{cell}$ denotes the same cell ID, $n_{RNTI}$ denotes the same RNTI.

7. The method according to claim 6, wherein the scrambling sequence is determined according to the cell ID of the serving cell and a Radio Network Temporary Identity (RNTI) acquired after random access or newly defined by the serving cell.

8. A mobile terminal configured to receive physical downlink shared channels, the mobile terminal configured to receive downlink data from a plurality of cells simultaneously, the mobile terminal comprising:

a radio frequency unit; and a processor operatively connected to the radio frequency unit and configured to:

receive, from each of the plurality of cells, a physical downlink shared channel (PDSCH) that is scrambled using a scrambling sequence determined according to a same cell ID and a same Radio Network Temporary Identity (RNTI), wherein the plurality of cells use the same cell ID in scrambling the PDSCH with the scrambling sequence for performing a coordinated multi-point (CoMP) operation, instead of using individual cell IDs of the plurality of cells, and wherein the PDSCH is scrambled based on following equations:

$$\tilde{b}^q(i) = (b^q(i) + c^q(i)) \bmod 2$$

$$c_{init} = n_{RNTI} \cdot 2^{14} + q \cdot 2^{13} + \left\lfloor \frac{n_s}{2} \right\rfloor 2^9 + N_{ID}^{cell}$$

where $b^{q(i)}$ denotes data of a q-th codeword of the PDSCH, $c^{q(i)}$ denotes the scrambling sequence, $n_s$ denotes a slot number, $N_{IC}^{cell}$ denotes the same cell ID, $n_{RNTI}$ denotes the same RNTI.

* * * * *